United States Patent
Lee et al.

(10) Patent No.: US 12,328,614 B2
(45) Date of Patent: *Jun. 10, 2025

(54) METHOD AND DEVICE FOR GENERATING AND REMOVING DYNAMIC EAS USING UE APP AND STATUS

(71) Applicant: Samsung Electronics Co., Ltd., Suwon-si (KR)

(72) Inventors: Jicheol Lee, Suwon-si (KR); Hyesung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

This patent is subject to a terminal disclaimer.

(21) Appl. No.: 18/326,875

(22) Filed: May 31, 2023

(65) Prior Publication Data

US 2023/0308927 A1  Sep. 28, 2023

Related U.S. Application Data

(63) Continuation of application No. 17/302,610, filed on May 7, 2021, now Pat. No. 11,706,652.

(30) Foreign Application Priority Data

May 8, 2020 (KR) ......................... 10-2020-0055485
Apr. 27, 2021 (KR) ......................... 10-2021-0054617

(51) Int. Cl.
*H04W 24/10* (2009.01)
*H04L 61/4511* (2022.01)
*H04L 67/52* (2022.01)

(52) U.S. Cl.
CPC ......... *H04W 24/10* (2013.01); *H04L 61/4511* (2022.05); *H04L 67/52* (2022.05)

(58) Field of Classification Search
CPC .... H04W 24/10; H04L 61/4511; H04L 67/52; H04L 41/0897; H04L 43/0876;
(Continued)

(56) References Cited

U.S. PATENT DOCUMENTS

| 9,112,782 B2 | 8/2015 | Siddiqui et al. |
| 2014/0143428 A1 | 5/2014 | Zheng |

(Continued)

FOREIGN PATENT DOCUMENTS

| WO | 2017100640 A1 | 6/2017 |
| WO | 2017186260 A1 | 11/2017 |

OTHER PUBLICATIONS

Supplementary European Search Report dated Aug. 17, 2023, in connection with European Application No. 21800173.3, 10 pages.

(Continued)

*Primary Examiner* — Chuong A Ngo

(57) ABSTRACT

Disclosed are a communication technique for merging, with an IoT technology, a 5G communication system for supporting a data transmission rate higher than that of a 4G system. The present disclosure relates to a wireless communication system, and more specifically, to an application layer network architecture providing an edge computing service in a cellular wireless communication system. According to an embodiment, a method of an EES comprises receiving, from an EEC, a first message including information used to determine matching EAS, and triggering an EAS management system to instantiate the matching EAS in response to receiving the first message.

20 Claims, 9 Drawing Sheets

(58) Field of Classification Search
CPC . H04L 41/5051; H04L 43/0817; H04L 67/10; H04L 67/125; H04L 67/02
See application file for complete search history.

(56) References Cited

U.S. PATENT DOCUMENTS

| | | |
|---|---|---|
| 2015/0026348 A1 | 1/2015 | Siddiqui et al. |
| 2021/0136177 A1* | 5/2021 | Hall ................ H04L 41/5051 |
| 2021/0219220 A1 | 7/2021 | Hall et al. |

OTHER PUBLICATIONS

3GPP TR 23.758 V17.0.0 (Dec. 2019), Technical Report, 3rd Generation Partnership Project; Technical Specification Group Services and System Aspects; Study on application architecture for enabling Edge Applications; (Release 17), Dec. 2019, 113 pages.

Samsung, "Application Client event reporting," S6-200730 (revision of S6-20xxxx), 3GPP TSG-SA Meeting #37e, E-meeting, May 14-26, 2020, 8 pages.

Samsung, "EAS instantiation triggered by EES," S6-202073 (revision of S6-20xxxx), 3GPP TSG-SA WG6 Meeting #430-e, e-meeting, Nov. 16-24, 2020, 1 page.

The First Office Action dated Jul. 12, 2024, in connection with Chinese Application No. 202180033844.4, 14 pages.

International Search Report and Written Opinion of the International Searching Authority in connection with International Application No. PCT/KR2021/005737 issued Aug. 13, 2021, 7 pages.

Convida Wireless LLC et al., "EAS discovery based on TR solutions 1 and 13", 3GPP TSG-SA WG6 Meeting #35 86-200242 (was S6-200050), Hyderabad, India, Jan. 13-17, 2020, 7 pages.

Convida Wireless LLC, "EAS registration based on TR solution 12", 3GPP TSG-SA WG6 Meeting #35 S6-200345 (was S6-200326 was S6-200240 was S6-200048) Hyderabad, India, Jan. 13-17, 2020, 3 pages.

Notice of Reasons for Refusal dated Mar. 11, 2025, in connection with Japanese Application No. 2022-567877, 8 pages.

* cited by examiner

METHOD AND DEVICE FOR GENERATING AND REMOVING DYNAMIC EAS USING UE APP AND STATUS

CROSS-REFERENCE TO RELATED APPLICATIONS

This application is a continuation of application Ser. No. 17/302,610, filed May 7, 2021, which is based on and claims priority under 35 U.S.C. § 119 to Korean Patent Application Nos. 10-2020-0055485 and 10-2021-0054617, filed on May 8, 2020 and on Apr. 27, 2021, in the Korean Intellectual Property Office, the disclosures of which are herein incorporated by reference in their entirety.

BACKGROUND

1. Field

The present disclosure relates to a device and method for providing an edge computing service, and more particularly, to a device and method for providing an edge computing service in a wireless communication system.

2. Description of Related Art

In order to meet the demand for wireless data traffic soring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation. There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing information technology (IT) techniques and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a big data processing technique may be said to be an example of the convergence of the 5G and IoT technologies.

Meanwhile, the 3GPP, which is in charge of cellular mobile communication standardization, has named the new core network structure 5G core (5GC) and standardized the same to promote the evolution from the legacy $4^{th}$ generation long term evolution (4G LTE) system to the 5G system.

5GC may support the following differentiated functions as compared to the evolved packet core (EPC), which is the legacy network core for 4G.

First, 5GC adopts the network slicing function. 5GC is required to support various types of UEs and services. For example, such services may include enhanced mobile broadband (eMBB), ultra-reliable low latency communications (URLLC), and massive machine-type communications (mMTC).

These UEs/services have different requirements for the core network. For example, the eMBB service may require a high data rate while the URLLC service may require high stability and low latency. Network slicing is technology provided to meet such various requirements.

Network slicing is a method for creating multiple logical networks by virtualizing one physical network, and the network slice instances (NSIs) may have different characteristics. Therefore, various service requirements may be met by allowing each NSI to have a network function (NF) suited for characteristics of each NSI. Accordingly, various 5G services may be efficiently supported by allocating an NSI meeting required service characteristics for each UE.

Second, 5GC may seamlessly support the network virtualization paradigm by separating the mobility management function and the session management function. In legacy 4G LTE, all UEs may receive services over the network through signaling exchange with a single core device called the mobility management entity (MME) in charge of registration, authentication, mobility management and session management functions.

However, in 5G, the number of UEs explosively increases and mobility and traffic/session characteristics that need to be supported according to the type of UE are subdivided. Resultantly, if all functions are supported by a single device, such as MME, the scalability of adding entities for each required function may decrease. Accordingly, various functions are under development based on a structure that separates the mobility management function and the session management function to enhance the scalability in terms of function/implementation complexity of the core equipment in charge of the control plane and the signaling load.

SUMMARY

According to an embodiment, there is provided a device and method for providing an edge computing service in a wireless communication system.

According to an embodiment, there is provided a method and device of dynamic EAS instantiation using UE app statuses.

According to an embodiment, there is provided a method and device that may instantiate the EAS associated with a UE's app at the time when the UE uses the app.

According to an embodiment, there is provided a method and device for reporting the AC status used to instantiate the EAS associated with the UE's AC.

In accordance with an embodiment, a method of an EES comprises receiving, from an EEC, a first message including information used to determine matching EAS; and triggering an EAS management system to instantiate the matching EAS in response to receiving the first message.

In accordance with an embodiment, an EES comprises a transceiver; and a processor configured to control the transceiver to receive, from an edge enabler client (EEC), a first message including information used to determine matching edge application server (EAS); and trigger an EAS management system to instantiate the matching EAS in response to receiving the first message.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure are described in detail with reference to the accompanying drawings. When determined to make the subject matter of the present disclosure unclear, the detailed description of the known art or functions may be skipped. The terms as used herein are defined considering the functions in the present disclosure and may be replaced with other terms according to the intention or practice of the user or operator. Therefore, the terms should be defined based on the overall present disclosure.

Hereinafter, the base station may be an entity allocating resource to terminal and may be at least one of eNodeB, Node B, base station (BS), radio access network (RAN), access network (AN), RAN node, wireless access unit, base station controller, or node over network. The terminal may include UE (user equipment), MS (mobile station), cellular phone, smartphone, computer, or multimedia system capable of performing communication functions. According to the present disclosure, downlink (DL) may refer to a wireless transmission path of signal transmitted from the base station to the terminal, and uplink (UL) refers to a wireless transmission path of signal transmitted from the terminal to the base station.

Although a post-LTE system is described below in connection with embodiments of the present disclosure, as an example, embodiments of the present disclosure may also apply to other communication systems with similar technical background or channel form. Further, embodiments of the present disclosure may be modified in such a range as not to significantly depart from the scope of the present disclosure under the determination by one of ordinary skill in the art and such modifications may be applicable to other communication systems (e.g., LTE or LTE-A systems).

Figure 1:
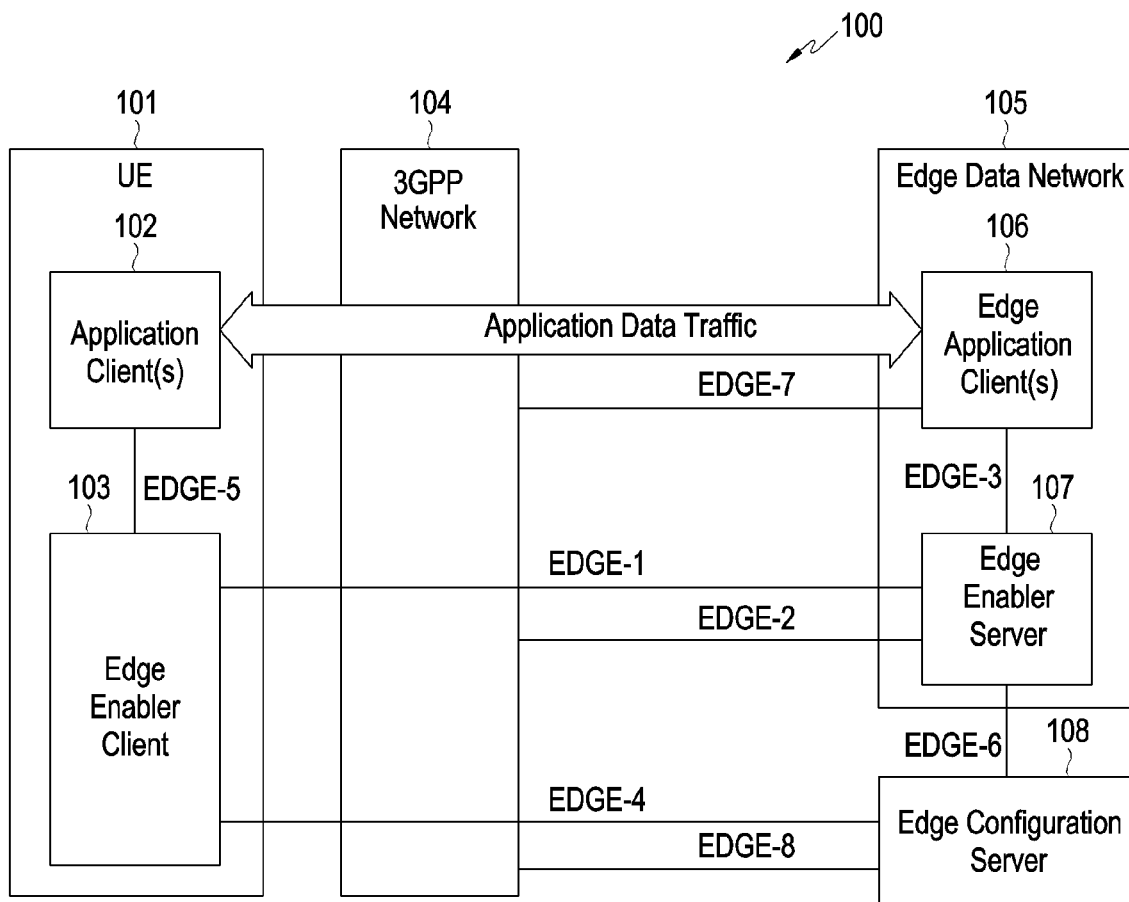
FIG. 1 illustrates an application network architecture and interface supporting edge computing according to an embodiment of the present disclosure.

FIG. 1 illustrates an application network architecture 100 supporting edge computing according to an embodiment of the present disclosure.

Referring to FIG. 1, a UE 101 may include at least one application client (AC) 102 and an edge enabler client (EEC) 103. The application client 102 may be an application-level client for providing to the user when an edge computing service is provided.

Further, the UE 101 may include a communication processor (CP) (not shown in FIG. 1) for communicating with another wireless communication network, e.g., at least one or more mobile communication networks.

The 3GPP network 104 is illustrated as a representative of mobile communication networks, and may include, e.g., an EPC and/or a 5GC. The 3GPP network 104 may include base stations that communicate directly with the UE 101 over-the-air (OTA) and may include a higher-level core network configuration. When the 3GPP network includes a 5GC, it may include an access and mobility management function (AMF), a session management function (SMF), a policy control function (PCF), and a user plane function (UPF).

Further, when having an EPC as a core network (CN), it may include network nodes corresponding to the 5GC.

Edge data networks may be implemented through a network slicing technique, and all edge data networks may be configured in the same form. A configuration of one edge data network 105 is described as an example, which may include an edge hosting platform and may include an edge enabler server (EES) 107, one or more edge application servers (EASs) 106, and an orchestrator for the edge hosting platform. The edge enabler server 106 may include an edge enabler client manager, an edge enabler platform, and an edge enabler application programming interface (API) server.

Network functions may be defined as follows, some of which are illustrated in FIG. 1.

3GPP network 104 may include a 3GPP radio access network (RAN) and a core network.

One or more edge data networks 105 are data networks of 5G core network or packet data networks of EPC network and may be data networks including functions for providing an edge computing service, such as an edge hosting platform edge enabler server.

Application client (AC) 102 may be an application program running on the mobile operating system of the UE 101 and may be identified by an application identifier on the 5G core network. In an environment providing a mobile operating system, the AC may be identified by the operating system (OS) identifier and the unique application identifier (OSAppID) for each OS.

One or more edge application servers 106 may be an application server programs running on a virtualization container or a virtual machine (VM) image operated on an edge hosting environment and may be server programs executed as the VM image is instantiated and may be called edge applications.

Edge configuration server 108 may be a server providing configuration information about the edge data network 105 to the UE 101 and may be an initial access server that may receive configuration information for the UE 101 to use a mobile edge computing (MEC) service.

Edge hosting platform may be platform software including a virtualization layer that may execute a plurality of edge application programs. In the present disclosure, the terms "edge hosting platform" and "edge hosting environment" have the same concept and may be interchangeably used.

Orchestrator for edge hosting platform may be a management system that manages the lifecycle for edge application programs running on the edge hosting platform and manages the edge hosting platform. It may perform the function of the orchestrator defined in the European telecommunication standards institute management and network operation (ETSI MANO).

Edge enabler server (EES) 107 may be a server for providing an edge computing service and may be a server that provides the UE 101 with a list of application programs available on the edge hosting platform (edge enabler client manager), manages configuration information about the edge application programs operated on the edge computing hosting platform, and provides an API for the function provided from the 3GPP network to the edge application programs.

Edge enabler client (EEC) 103 may be a software module of the UE 101 and may be a software agent having functions for providing an edge computing service. It may perform authentication function for the UE to access the edge computing server, and it may be a software agent by which the UE 101 receives the information provided from the edge hosting platform while interworking with the edge enabling server 107, performs a routing necessary for the UE application program, and provides information to the UE application program.

The application network architecture for supporting edge computing as shown in FIG. 1 may be managed by a separate edge computing service provider from the mobile communication service provider, and there may be a plurality of separate edge computing service providers in one mobile communication service provider network. The application network architecture for supporting edge computing as shown in FIG. 1 may support the service provider's configuration.

The application network architecture shown in FIG. 1 may support a plurality of edge computing service providers in one mobile communication network. The application network architecture may transfer a plurality of edge computing service providers available in one mobile communication network and configuration information for accessing the edge computing network installed by the service provider to the UE.

The application network architecture shown in FIG. 1 may transfer an edge network service provider selected by the mobile communication service provider among the plurality of edge computing service providers present in one mobile communication network and configuration information for accessing the edge computing network installed by the selected edge network service provider to the UE.

Various embodiments of the present disclosure are described below. The present disclosure may relate to a method and device for providing two scenarios, as follows, for a service provider to install a flexible edge network and implementing the same.

In one embodiment 1 of the present disclosure, a service subscription procedure is provided for an app screen control change, app traffic detection, and app domain name system (DNS) request detection reporting due to an AC status, e.g., AC installation, start, or the user's action, from the EAS.

Figure 2:
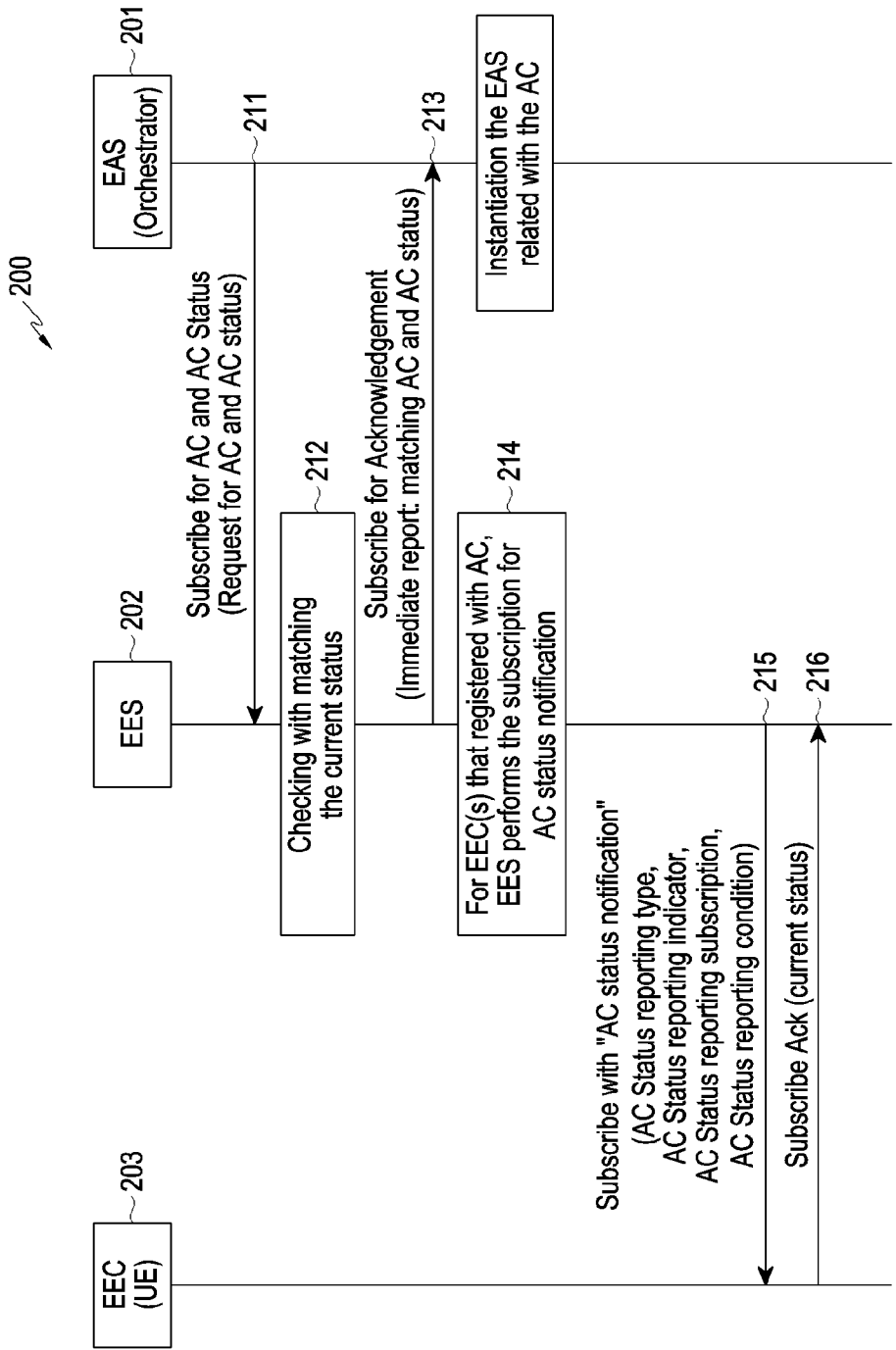
FIG. 2 is a flowchart illustrating a subscription request procedure for AC status and AC traffic status reporting according to an embodiment 1 of the present disclosure.

FIG. 2 is a flowchart illustrating a subscription request procedure 200 for AC status and AC traffic status reporting according to an embodiment 1 of the present disclosure.

Referring to FIG. 2, the EAS 201 sends a request for AC status/status change reporting and/or AC traffic status/status change reporting to the EES 202 (e.g., operation 211).

In this case, the status report request message may be a one-time report request or may be a report request for a status change of a designated AC for each EEC (or for each GPSI).

When the EES 201 receives the request for AC status/status change and/or AC traffic status/status change, if the request is not a one-time request, the EES 201 receives a report and expiration condition for a target UE or target EEC list, AC status/status change and/or AC traffic status/status change, allocates a transaction identifier for the corresponding report, and records such information. When a corresponding event report is received in the future, information by which the requester of the event report may be identified is retained together.

When the event subscription is successfully complete, the EES 202 transfers a response message for the report request to the EAS 201 (e.g., operation 213). When the report is not a one-time report and the event reporting condition and expiration condition are contained in the request message, the transaction identifier information allocated in operation 212 which may identify the subscription request may be included and transferred.

According to an embodiment, the EES 202 which has already received a report for the status of the plurality of ACs from the one or more EECs identifies the status for the ACs of the EEC or EECs requested from the EAS 201 (e.g., operation 212). The EES 202 reports the identified AC status of the EEC to the EAS 201. In this case, the EES 202 transfers an AC status report including information about the AC status and/or EEC matching the condition for the requested AC and AC status, along with the response message of operation 214, to the EAS 201.

When the EAS 201 receiving the AC status report including the information about the AC status and/or the EEC (and the UE) is an orchestrator, the orchestrator may use the status information about the related AC in instantiating, load-balancing, scaling-in, or scaling-out the EAS.

The EES 202 which transfers the response message in operation 213 may perform a subscription request procedure described in connection with operations 215 and 216 for the AC status report or AC traffic status report on at least one EEC 203, for registered EECs (e.g., operation 214).

The EES 202 transfers a subscription request message for the AC status information to the EEC 203 (e.g., operation 215). The subscription request message for the AC status and/or AC traffic status information report includes at least one of an AC list, an AC status report event list, edge awareness information for the AC, EAS service area information, an AC status report type, an AC status report indicator, AC status reporting subscription information, or an AC status trigger condition.

The subscription request message may also include whether the report is a one-time report or continuous report and, if the report is a continuous report, a condition for completing the report (e.g., the maximum number of times of reporting, the period during which the maximum number of times of reporting may be reported, and the number of occurrences of an event for the reporting complete time). The AC status report event list may include AC status information and AC status change information and AC traffic status and AC traffic status change information by which it may be predicted whether traffic is generated between the AC and the EAS. For example, the AC status information is described below in connection with an embodiment 4. The status information for AC traffic is described below in connection with an embodiment 5.

Upon receiving the subscription request message for the AC status information report, the EEC 203 transmits a response message for the subscription request message to the EES 202 if the subscription request for the AC status information report of the EES 202 is successfully registered (e.g., operation 216). When the subscription request for the AC status information report is a one-time request, the EEC 203 may transmit the AC status information together with the response message.

In one embodiment 2 of the present disclosure, a procedure is provided for the EEC to report the status of the AC to the EES that has requested the AC status report when the AC status is changed to a status matching the reporting condition according to the AC status and AC status change report service and/or AC traffic status and AC traffic status change report service subscribed to in the embodiment 1 of the present disclosure. Upon receiving a report of a change in the UE's AC status, the EES reports the current AC status change of the UE to the EAS requesting the AC status change report. The AC status change report may be used for the orchestrator to generate a new instance (instantiation) for the EAS or to remove an existing instance generated.

Figure 3:
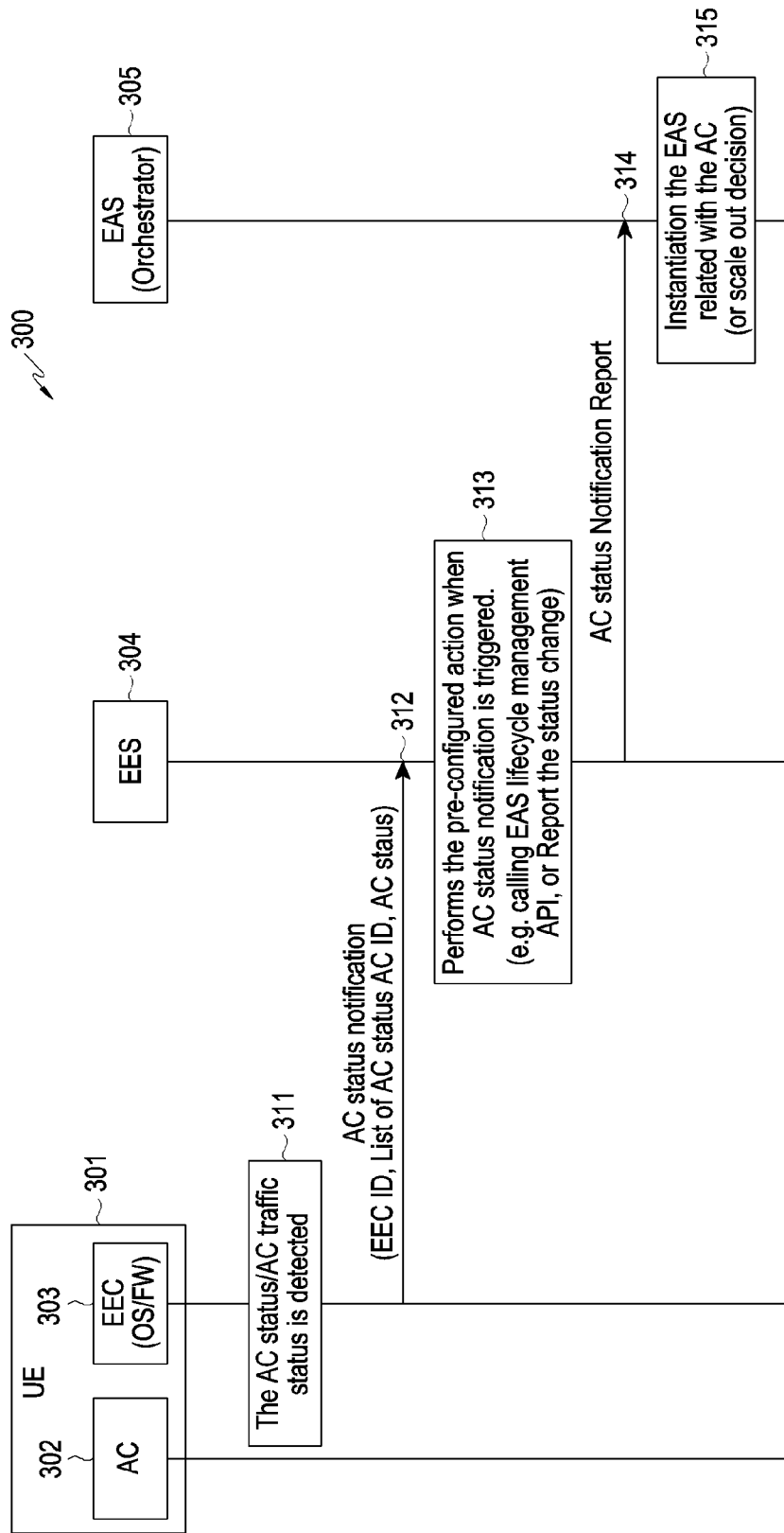
FIG. 3 is a flowchart illustrating a procedure for AC status and AC traffic status detection and reporting according to an embodiment 2 of the present disclosure.

FIG. 3 is a flowchart illustrating a procedure 300 for AC status and AC traffic status detection and reporting according to an embodiment 2 of the present disclosure.

Figure 6:
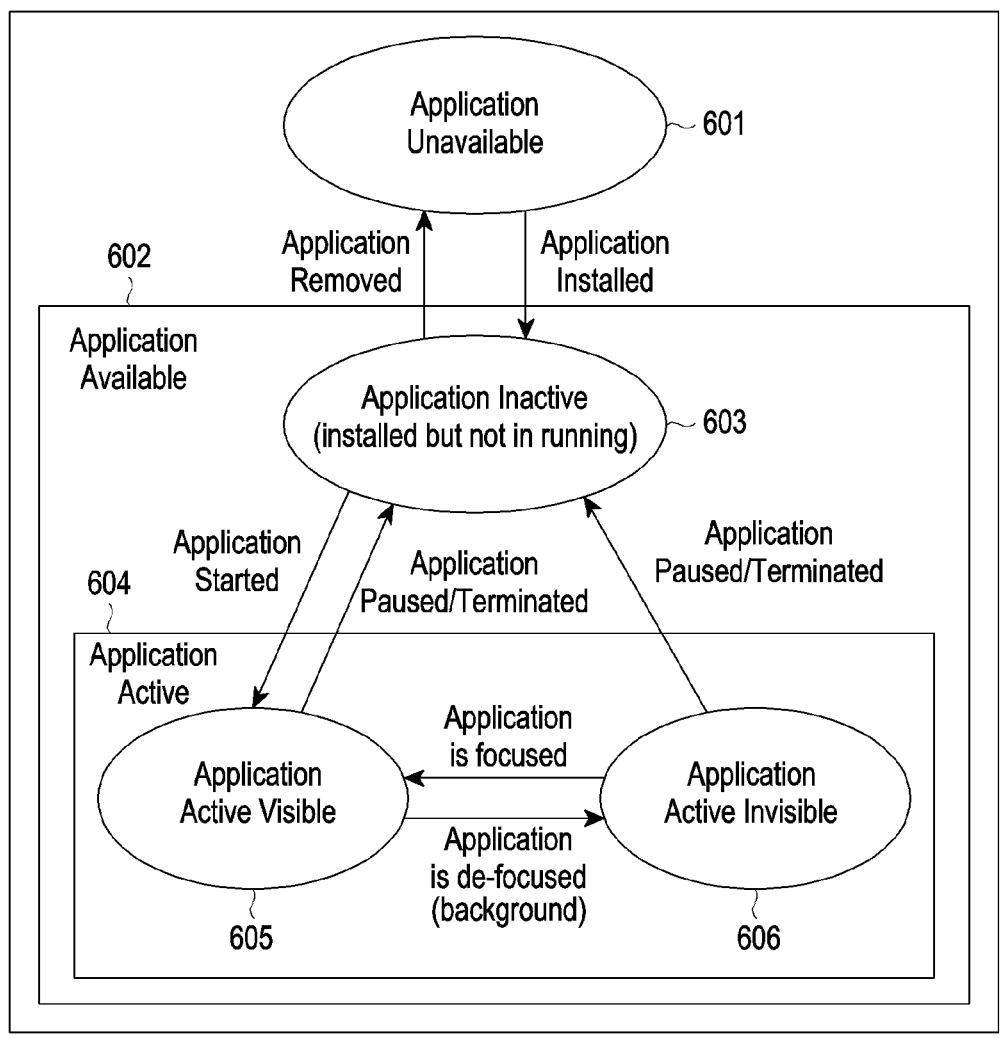
FIG. 6 is a flowchart illustrating a status transition for a UE app status according to a user's work according to an embodiment 4 of the present disclosure.

Referring to FIG. 3, an EEC 303 may obtain an AC status and/or AC traffic status or detect an AC status change or AC traffic status change (e.g., operation 311). AC status change refers to an AC status that is changed on the mobile operating system due to the user's action. The AC status and status change may have statuses including the following attributes as shown in FIG. 6 and the embodiment 4 of the present disclosure described below.

A status according to whether an AC 302 is installed on the mobile operating system in the UE 301.

A status according to whether the AC 302 is performed or not on the mobile operating system in the UE 301.

Statuses which are divided into a foreground or background status or a visible or invisible status depending on whether the AC 302 is displayed on the user screen on the mobile operating system, whether the AC 302 has the right to control the user screen, or whether the AC 302 has the right to control user interaction.

A change in AC status may have the characteristic of status movement in which the AC 302 generated by the user's action on the mobile operating system is installed, executed, paused, terminated, and the AC 302 is moved to the foreground screen or background screen.

As an example of the status having the characteristics of the AC status and status change, there may be a status and status transition method as in the embodiment 4 described below.

In operation 215 of FIG. 2, upon receiving a report request for a status change of the AC, the EEC 303 may detect a status change of the AC, such as installing, starting to execute, stopping executing, terminating, or changing to a visible or invisible status the requested AC.

When a movement of the AC to a specific status is requested as a reporting condition in operation 215 of FIG. 2, the EEC may detect the movement of the AC to the specific status.

Figure 7:
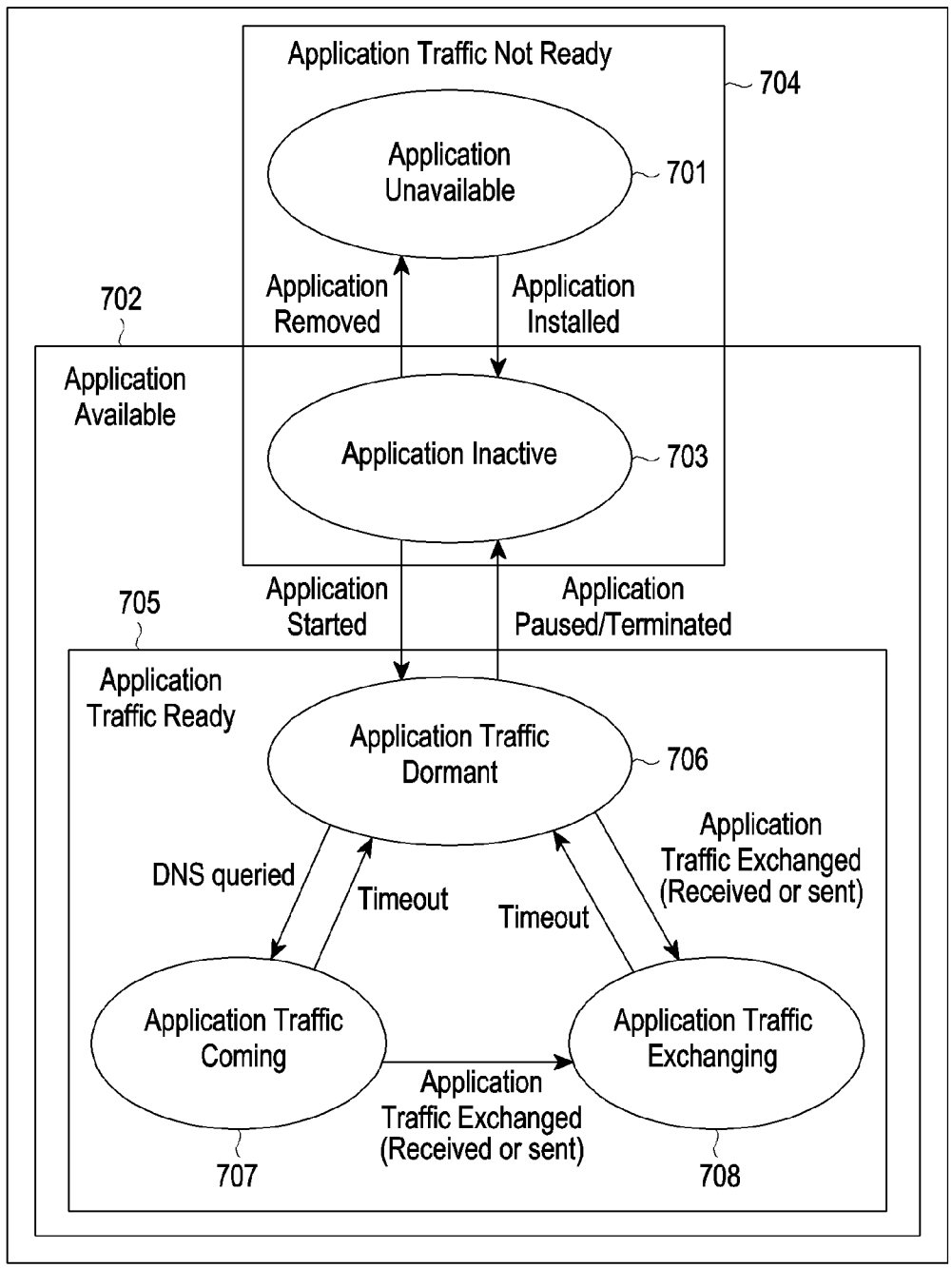
FIG. 7 is a flowchart illustrating a status transition for a UE app traffic status according to an embodiment 5 of the present disclosure.

The AC traffic status and status change may have statuses including the following attributes as shown in FIG. 7 and the embodiment 5 described below.

A status as to whether application traffic may be generated without the user's intervention or not. Examples of such status may be divided into application traffic not ready or application traffic ready.

A status as to whether an application is installed on the UE's operating system or executed on the mobile operating system. Examples of such status may be divided into application unavailable, application inactive, and application traffic ready.

An application traffic generation status which may be divided into whether application traffic is to be generated soon, has already been generated, or whether it is a dormant period during which no traffic is generated. Examples of such status may include application traffic dormant, application traffic coming, and application traffic exchanging.

The AC traffic status change may have the characteristic of status movement that the AC's traffic generation or readiness for generation is detected and is moved. An example of the status having the characteristic of the AC traffic status and status transition may have a status and status transition method as in the embodiment 5 described below.

In operation 215 of FIG. 2, upon receiving a request for reporting the status change of AC traffic, the EEC 303 may detect a change in the AC traffic ready status, e.g., a change from AC traffic not ready to AC traffic ready, or a change in AC traffic status between AC traffic dormant, AC traffic coming, and AC traffic generation statuses. For example, the AC traffic dormant status may transition to the application traffic coming status when a DNS query occurs from the AC or a DNS query for the destination EAS occurs. When the application traffic generated from the AC is detected or when generation of application traffic from the AC to the destination EAS is detected, the application traffic dormant status is changed to the application traffic exchange status.

When a movement of the AC traffic status to a specific status is requested as a reporting condition in operation 215 of FIG. 2, the EEC 303 may detect the movement of the AC to the specific status.

Upon detecting a movement of the AC status to a status meeting the reporting condition, a change in the AC status, a movement of the AC traffic status to a status meeting the reporting condition, or a change in the AC traffic status, the EEC 303 may transmit an AC status/status change and/or AC traffic status/status change report message to the EES 304 (e.g., operation 312). The AC status and/or AC traffic status report message may include at least one of an EEC identifier, an AC identifier list to be reported, a differentiator for distinguishing the transaction for subscription request from the others, per-AC identifier AC status information, per-AC identifier AC traffic status information, when the AC status is changed, per-AC identifier AC prior status information, when the AC traffic status is changed, prior status information of AC traffic per AC identifier, when traffic having a specific EAS as the destination, an identifier for the specific EAS, or fully qualified domain name (FQDN) information, IP address information, or uniform resource locator (URL) information for the specific EAS. The AC status/status change report and/or AC traffic status/status change report message may be transferred along with an EAS discovery procedure.

According to an embodiment, upon receiving a report of the AC status/status change and/or AC traffic status/status change from the EEC 303, the EES 304 may request the orchestrator and perform a preset procedure (e.g., operation 313). The preset procedure may include the operation of invoking the API managing the lifecycle of the EAS 305, the operation of performing a report for the AC status/status change and/or AC traffic status/status change on the UE's AC in a designated place, or the operation of determining and reporting a scale-in or scale-out on the EAS corresponding to the AC. Further, the preset procedure may include at least one of the operation of instantiating the EES instance according to the AC status/status change and/or AC traffic status/status change to the orchestrator operating as an EAS, the operation of additionally instantiating the EES instance, or the operation of deleting the EES instance. When operation 313 is performed, operations 211 and 214 of FIG. 2 may be omitted.

Upon receiving the AC status/status change and/or AC traffic status/status change from the EEC 303, the EES 304 reports at least one of the AC status information, AC status change information, AC traffic status information, or AC traffic status change information to the EAS 305 or orchestrator that has requested to report the AC status/status change and/or AC traffic status/status change (e.g., operation 314). The EES 304 may provide a report including information about the EAS 305 corresponding to the AC 302 to the orchestrator. The EAS 305 corresponding to the AC 302 means an application server providing a service for the AC 302.

Upon receiving the AC status/status change and/or AC traffic status/status change report, the orchestrator may obtain information for the EAS 305 corresponding to the AC 302 and perform operations for, e.g., generating, adding, and deleting the EAS instance (e.g., operation 315).

In one embodiment 3-1, the EES receives an AC status and AC traffic status reporting subscription request of the UE from the EAS, and the EES records the subscription request.

While the EEC registers in the EES, the EES identifies whether the EEC belongs to targets for AS status and/or AC traffic status reporting and, if the EEC belongs to the targets for reporting, transfers a registration response message including the target AC list, condition information for the target AC, whether the report request is a one-time status report request, a reporting condition including a condition and expiration condition, and an identifier for identifying the reporting subscription to the EEC. Upon receiving the AC status/status change and/or AC traffic status/status change report from the EEC, the EES transfers the reported status to the EAS or orchestrator requesting the report. The EES may directly determine an increase/decrease in the number of instances and instantiation to the EAS corresponding to the AC or transfer a message to the orchestrator, thereby performing a procedure for determining whether the EAS instantiates or whether to increase or decrease the number of instances of the EAS.

Figure 4A:
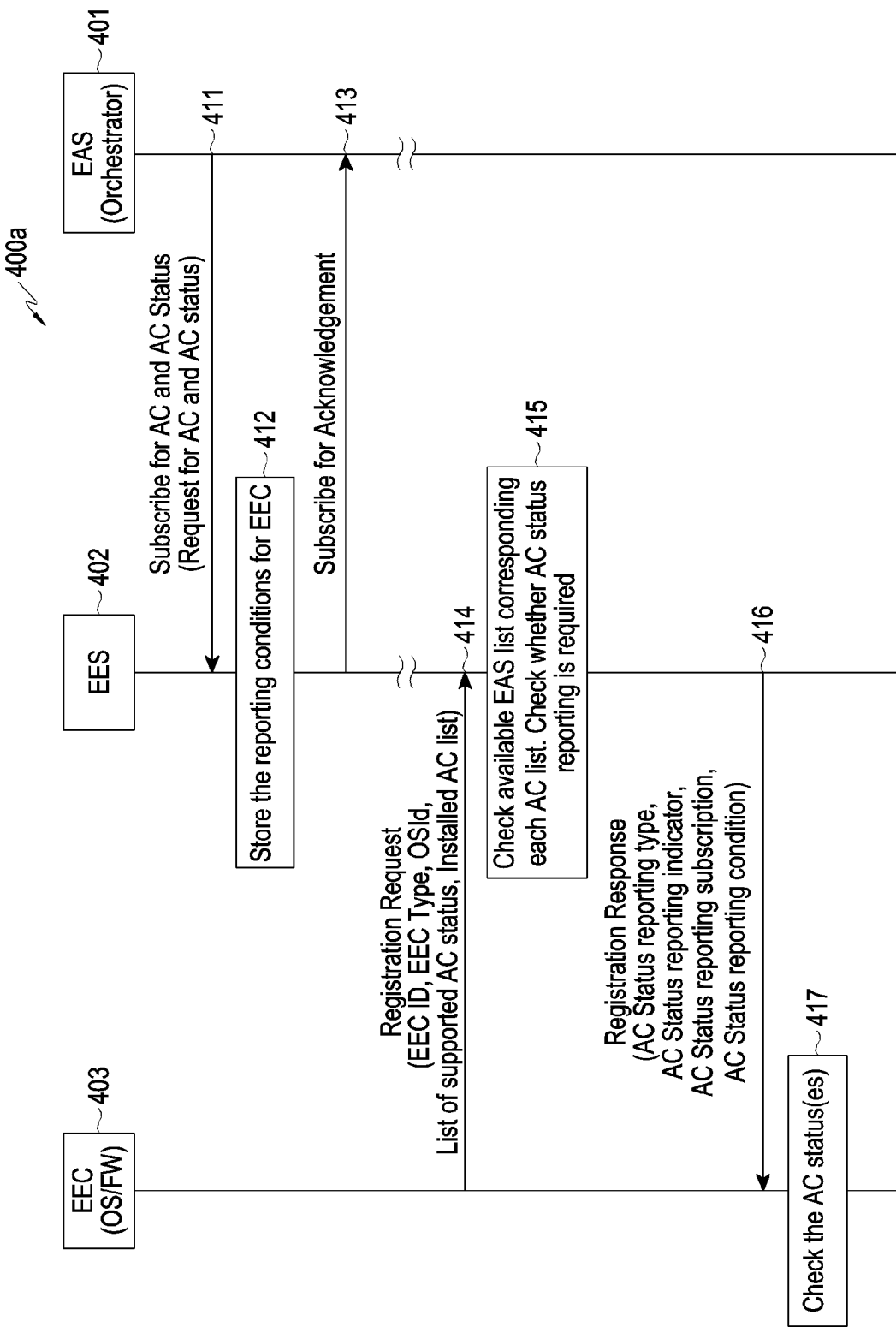
FIGS. 4A and 4B is a flowchart illustrating a procedure for AC status and AC traffic status reporting in an EEC registration process according to an embodiment 3-1 of the present disclosure.
Figure 4B:
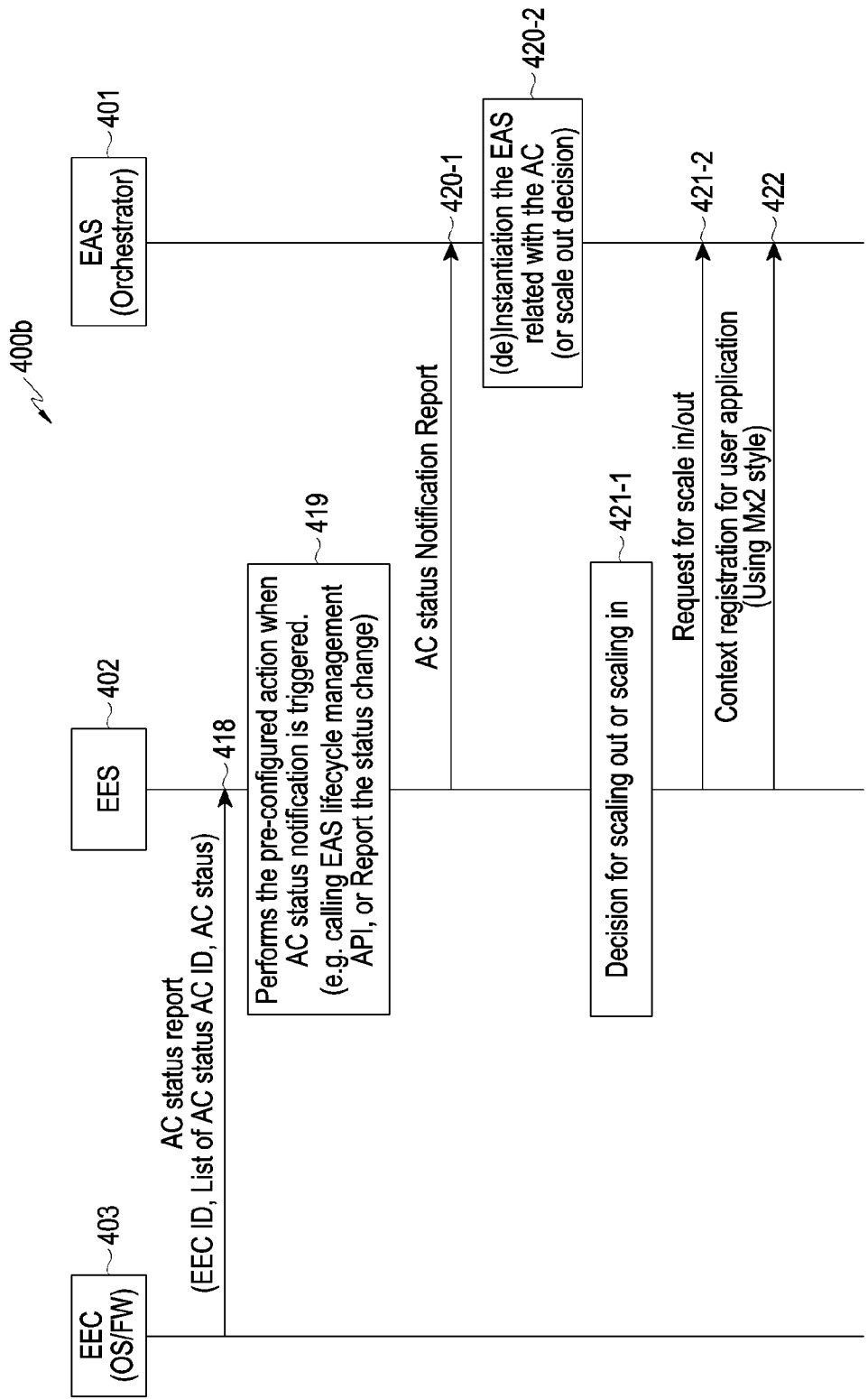

FIGS. 4A and 4B is a flowchart illustrating an AS status and/or AC traffic status report procedure during an EEC registration process according to an embodiment 3-1 of the present disclosure.

Referring to FIGS. 4A and 4B, the EAS 401 sends a request for AC status/status change reporting and/or AC traffic status/status change reporting to the EES 402 (e.g., operation 411).

In this case, the status report request message may be a one-time report request or may be a report request for a status change of a designated AC for each EEC (or for each GPSI).

When the EES 402 receives the request for AC status/status change and/or AC traffic status/status change, if the request is not a one-time request, the EES 201 receives a report and expiration condition for a target UE or target EEC list, AC status/status change and/or AC traffic status/status change, allocates a transaction identifier for the corresponding report, and records such information (operation 412). When a corresponding event report is received in the future, information by which the requester of the event report may be identified is retained together.

When the event subscription is successfully complete, the EES 402 transfers a response message for the report request to the EAS 401 (e.g., operation 413). When a report is not a one-time report and the event reporting condition and expiration condition are contained in the request message, the transaction identifier information allocated in operation 412 which may identify the subscription request may be included and transferred.

According to an embodiment, the EES 402 which has already received a report for the status of the plurality of ACs from the one or more EECs identifies the status for the ACs of the EEC or EECs requested from the EAS 401 (e.g., operation 212). The EES 202 reports the identified AC status of the EEC to the EAS 201. In this case, the EES 202 transfers an AC status report including information about the AC status and/or EEC matching the condition for the requested AC and AC status, along with the response message of operation 413, to the EAS 201.

The EEC 403 performs a procedure for registration in the EES 402 according to a designated condition. When the UE moves to an area where the EES 402 is provided or when the EEC receives selection information for the EES from the ECS and the EEC selects the EES, as the designated condition, the EEC 403 performs a procedure for registration in the EES 402. When the EEC 403 performs a procedure for registration in the EES 402, the EEC 403 may include all or some of AC lists installed on the UE in a registration request message and transfer the same (operation 414). The EEC 403 in the UE may include, in the registration request message, at least one of an AC identifier, an EEC type (an indicator as to whether the EEC is downloadable or embedded), an indicator as to whether an AC status/status change and/or AC traffic status/status change report function is supported, a supported AC status/status change and/or AC traffic status/status change list, or a mobile operating system identifier and transfer the same to the EES 402.

The EES 402 receives the registration request message from the EEC 403. Upon receiving the registration request message, the EES 402 may identify an available EAS list corresponding to each AC list. Further, the EES 402 may identify whether the EEC 403 belongs to targets for AS status and/or AC traffic status reporting. Whether the EEC 403 belongs to targets for reporting may be identified through the following information:

EEC identifier;
identifier of the UE equipped with the EEC. For example, the number of the UE device, such as the permanent equipment identifier (PEI);
Subscriber information for the UE equipped with the EEC, (generic public subscription identifier (GPSI));
Location information for the UE (e.g., location information in 3GPP or data network access (DNA) identifier, GPS coordinate information, or address information, such as lot number, building number, etc.);
Service area information for the UE; and/or
IP address information for the UE.

When the EEC 403 belongs to targets for reporting, the EES 402 designates a target AC for the UE. The target AC may include a list of AC identifiers or condition information for the target AC. Conditions for the target AC may include the following examples:

Information in which the AC ID is expressed in regular expression among ACs installed on the UE or running ACs, e.g., com.example;
List of ACs newly installed on the UE;
List of ACs newly executed on the UE;
List of all ACs in the visible status among the apps currently running on the UE; and
List of ACs that transition from the invisible status to the visible status among the apps currently executed on the UE.

When the EEC 403 belongs to targets for reporting, the EES 402 transmits a response message for the registration request to the EEC 403 (operation 416). The response message includes at least one of an AC list, an AC status report event list, edge awareness information for the AC, EAS service area information, an AC status report type, an AC status report indicator, AC status reporting subscription information, or an AC status trigger condition.

Upon receiving the response message, the EEC 403 identifies whether the report is a one-time report and, if the report is a one-time report, the EEC 403 performs reporting only one time.

If there is a condition for the report, the EEC 403 records the identifier for identifying the EEC subscription request, reporting condition, and expiration condition and records a condition for triggering the reporting condition and expiration condition.

The EEC 403 identifies the reporting conditions for currently installed ACs (operation 417).

For the installed ACs, the EEC 403 identifies the reporting condition and, when the reporting condition is met, transfers an AS status report and/or AC traffic status report message to the EES 402 (operation 418). The message transferred to the EES 402 may include at least one of the EEC identifier, an AC identifier list to be reported, differentiator for distinguishing the subscription-requested transaction from the others, AC status information per AC identifier, when the AC is changed, AC prior status per AC identifier, AC traffic status per AC identifier, or when AC traffic is changed, AC traffic prior status information per AC identifier. When the reporting condition is met, and the report request is a one-time request, reporting is performed only once. When the report request received from the EES 402 is not a one-time request, and it includes both the reporting condition and the expiration condition, the EEC 403 may record the report request and, when the reporting condition is met, perform operation 418. When an event that meets the report expiration condition occurs, no further report is made, and the recorded report request is deleted.

When the EAS 401 or orchestrator requests AC status/status change and/or AC traffic status/status change reporting through operation 411, the EES 402 may transfer the information reported from the EEC 403 to the corresponding EAS 401 or orchestrator (operation 420-1). The EAS 401 or orchestrator may receive the AC status/status change and/or AC traffic status/status change report from the EES 402 and determine an operation for generating, adding, deleting, upgrading, or downgrading an EAS instance related to the AC (e.g., operation 420-2).

According to an embodiment, upon receiving the AS status/status change and/or AC traffic status from the EEC 403, the EES 402 may perform a preset procedure (e.g., operation 419). The preset procedure may include the operation of invoking the API managing the lifecycle of the EAS 401 or the operation of performing AC status/status change and/or AC traffic status/status change reporting on the UE's AC in a designated place. When operation 419 is performed by the EEC 402, operations 411 and 413 may be omitted.

When the preset procedure in the EES 402 includes an operation for adding, generating, or deleting an EAS instance according to the AC status/status change and/or AC traffic status/status change, the EES 402 may determine whether to scale in or scale out the EAS corresponding to the AC (e.g., operation 421-1). Scale-out is an operation for increasing the number of EAS instances, and scale-in is an orchestration operation for the EAS 401 to reduce the number of EAS instances. The EES 402 may transfer a request for the determined scale-out or scale-in to the EAS 401 or the orchestrator (e.g., operation 421-2).

Upon reporting the AC status/status change and/or AC traffic status/status change according to the preset procedure, the EES 402 may perform context registration or release on the EAS 401 corresponding to the orchestrator (e.g., operation 422). For example, when the AC status event reported from the EEC 403 is an AC start event or AC traffic start-soon event, it may perform a context registration or release procedure on the EAS 401 corresponding to the AC. The orchestrator that receives a request for context registration or release on the EAS 401 may generate a new EAS instance or perform the function of increasing or decreasing the number of existing EAS instances.

In one embodiment 3-2 of the present disclosure, a method is provided for allowing an EAS corresponding to an AC to be dynamically instantiated, in which an EES receives an AC profile (including an AC ID) associated with the EAS through a registration request from an EAS, determines a trigger condition under which the EEC needs to transmit a discovery request when the EEC sends a registration request, transmits a trigger condition to perform EAS discovery to the EEC and then receives an EAS discovery request message from the EEC detecting a status change in the AC.

Figure 5:
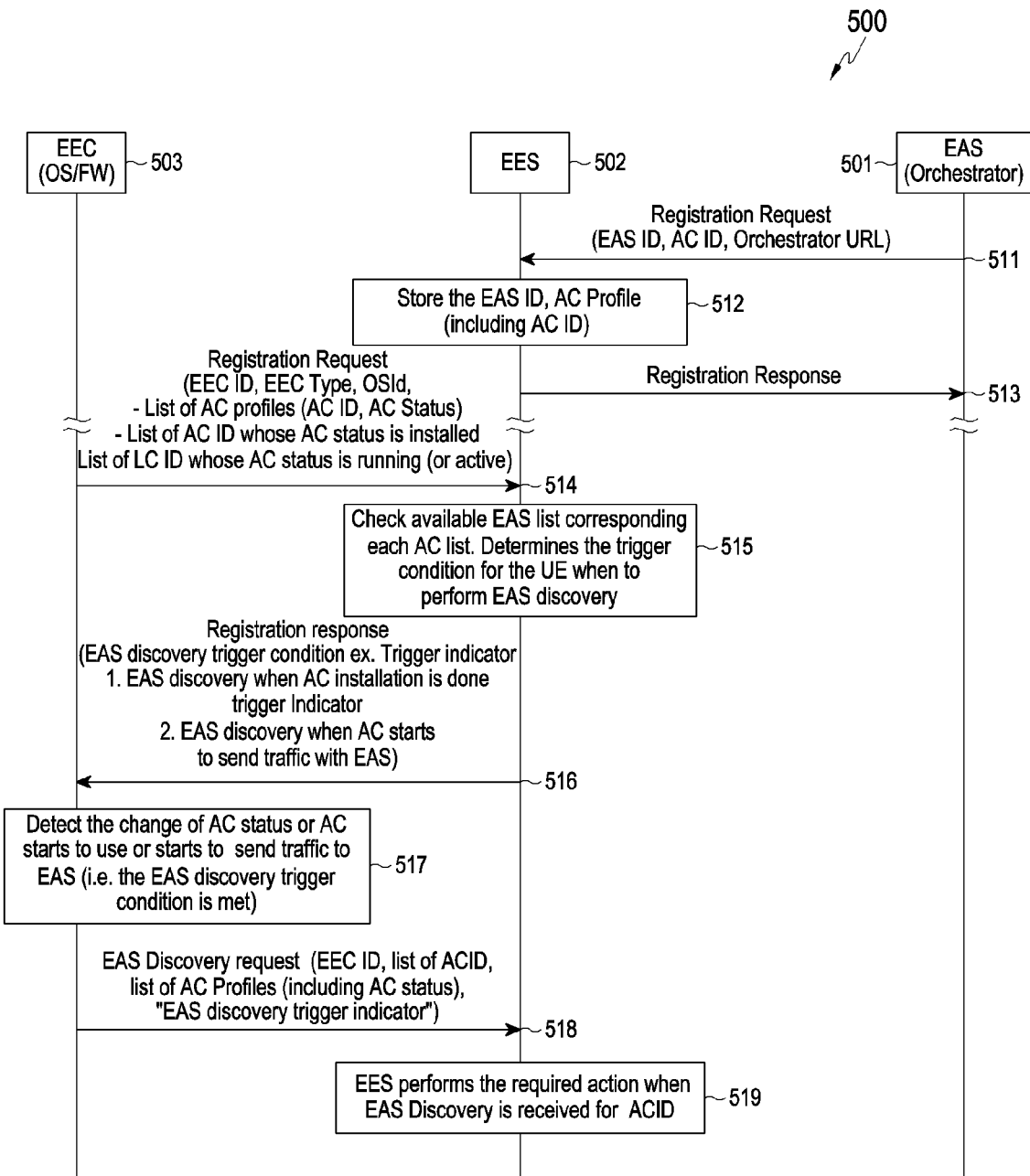
FIG. 5 is a flowchart illustrating a procedure for dynamically instantiating an EAS by an EES according to an embodiment 3-2 of the present disclosure.

FIG. 5 is a flowchart illustrating a procedure for dynamically instantiating an EAS by an EES according to an embodiment 3-2 of the present disclosure.

Referring to FIG. 5, an EAS 501 transmits a registration request message to an EES 502 to perform an EAS registration procedure (e.g., operation 511). According to an embodiment, the EAS registration procedure may be performed, instead of an EAS, by an orchestrator managing an edge hosting environment when the EAS capable of instantiation is managed in the edge hosting environment. In this case, the EAS registration procedure may be performed by an orchestrator that manages the life cycle of the EAS 501 through the edge hosting environment on behalf of the EAS 501. When the orchestrator performs the registration procedure, the EAS ID does not refer to the ID of a specific instance but may collectively refer to a plurality of instantiated EAS instances. When the orchestrator performs the registration process, the EAS ID refers to a comprehensive EAS, and multiple instantiated EAS entities have the same EAS ID. According to another embodiment, the registration procedure performed on the EES 502 by the EAS 501 may be performed by the EAS of a new instance. In this case, the EAS registration procedure may be performed to register a newly instantiated EAS instance to allow the EES 502 to discover another EES or an EAS instance available to the EEC 503. The registration request message transmitted from the EAS 501 to the EES 502 may include at least one of an EAS ID or information about an AC where the EAS 501 provides a service, that is, an AC profile. The AC profile may include additional information about the AC along with the AC ID. Further, the registration request message transmitted from the EAS 501 to the EES 502 may include URL information for the orchestrator. The EES 502 stores and manages the EAS ID and/or AC profile information included in the registration request message received from the EAS 501 (operation 512). Upon receiving the registration request message from the EAS 501, the EES 502 transmits a message responsive to the registration request message to the EAS 501 (e.g., operation 513).

Referring continuously to FIG. 5, the EEC 503 transmits a registration request message to the EES 502 to perform a registration procedure for the EES 502 (e.g., operation 514). The registration request message transmitted from the EEC 503 to the EES 502 includes an EEC ID, an EEC type (e.g., an identifier indicating whether it is of an embedded type or an AC type), an operating system ID, the IDs of ACs currently installed on the UE, and/or a list of ACs associated for the EEC 503 to currently provide an edge computing service, or an ID list of ACs installed on the UE which may be currently identified by the EEC 503, and/or an ID list of ACs running on the UE which may be currently identified by the EEC 502.

According to an embodiment, when the EEC 503 supports the EAS discovery trigger condition, the EEC 503 may include an EAS discovery trigger capability indicator in the registration request message transmitted to the EES 502.

Upon receiving the registration request message from the EEC 503, the EES 502 identifies the AC list transmitted from the UE. The EES 502 identifies an available EAS list corresponding to the AC list transmitted from the UE and determines a trigger condition to perform EAS discovery for the corresponding EAS (e.g., operation 515). Such a trigger condition may be previously set in the EES 502 or may be information received through the ECS or a separate policy server. As an example, the trigger condition may be set in the EES 502 through an authorization setting response message during a service authorization setting (e.g., service provisioning) process, from the ECS.

According to an embodiment, conditions for triggering EAS discovery may include all or some of the following conditions:

When an AC is newly installed or reinstalled in the UE;
When the AC installed on the UE changes into an execution status;
When the AC sends a request for use of edge computing to the EEC;
When the AC detects traffic sending traffic to the EAS;
When the AC performs DNS query to send traffic to the EAS;
AC status described in connection with the 4th embodiment (as exists);

Change in AC status described in connection with the 4th embodiment;

AC traffic status described in connection with the 5th embodiment; and/or

When the AC traffic status changes as described in connection with the embodiment 5.

Each item of the above-described EAS discovery trigger conditions may be designated as an EAS discovery trigger indicator index as illustrated in Table 1 below.

TABLE 1

EAS discovery trigger indicator index

| Index | EAS Discovery Trigger Conditions |
|---|---|
| 1 | When an AC is newly installed or reinstalled in the UE, |
| 2 | When the AC installed on the UE changes into an execution status, |
| 3 | When the AC detects traffic sending traffic to the EAS |
| 4 | When the AC performs DNS query to send traffic to the EAS |
| 5 | Change in AC status |
| 6 | Change in AC traffic status |

In response to the registration request message received from the EEC 503, the EES 502 transmits a registration response message containing the EAS discovery trigger condition (e.g., EAS discovery trigger indicator index information indicating the EAS discovery trigger condition) to the EEC 503 (e.g., operation 516).

According to an embodiment, when the EAS discovery trigger condition is a change in traffic status or a specific AC status, the EES 502 may transmit the corresponding AC ID together to the UE or an EAS ID list corresponding to the AC ID to the UE.

While the EEC 503 registers in the EES 502, the EES 502 may transmit an EEC registration response message including at least one of the following information to the EEC 503:

A list of currently available EASs in the list of ACs installed on UE, received from the EEC 503;

A list of EASs that may be currently EAS-instantiated in the list of ACs installed on the UE, received from the EEC 503;

EAS discovery trigger condition information for AC;

A list of EASs that have requested EAS instantiation dynamically through EAS discovery in the list of EASs registered in the EES 502; or A list of ACs corresponding to the EAS 501 that have requested EAS instantiation dynamically.

According to an embodiment, the EEC 503 may provide a function of detecting the EAS discovery trigger or may support a function of transmitting an EAS discovery request according to the EAS discovery trigger condition received from the EES 502.

Upon receiving the registration response message from the EES 502, the EEC 503 identifies at least one of the following contents:

detection of change in AC status;

detection of the AC using traffic connection with the EAS 501; or detection of the AC to transmit traffic to the EAS 501.

The identification procedure by the EEC 503 as described above corresponds to a procedure for identifying whether the EEC 503 meets the EAS discovery trigger condition included in the registration response message (e.g., operation 517).

Upon receiving the EAS discovery trigger condition included in the registration response message from the EES 502, the EEC 503 transmits an EAS discovery request message to the EES 502 when the EAS discovery trigger condition is met (e.g., operation 518). The EAS discovery request message transmitted from the EEC 503 to the EES 502 may include the following information:

An EEC ID;

A list of IDs of ACs installed or running;

A list of AC profiles including the status of AC; and/or

An EAS discovery trigger indicator index (corresponding to, e.g., the index shown in Table 1) when an EAS discovery request message is transmitted as the EAS discovery trigger condition is met.

According to another embodiment, even when the EAS discovery trigger condition is not received, if there is the EEC 502's own setting or the operator's setting, and the following conditions are met, the EEC 502 may transmit an EAS discovery request message to the EES 502.

When the AC status changes as described in connection with the embodiment 4, more specifically:

When an AC is newly installed (i.e., the AC status changes into an installed status);

When the AC changes into a running status;

When the AC changes into the foreground; and/or

When the UI is focused for user interaction at the user's request.

When the AC traffic status changes as described in connection with the embodiment 5, more specifically:

When the AC detects transmission of traffic to the EAS;

When the AC transmits a DNS query to send traffic to the EAS or when the AC detects transmission of a DNS query; and/or When the AC changes from a status in which no traffic is sent to a status in which traffic is set.

When the EEC 503 transmits the EAS discovery request message to the EES 502, the EEC 503 may include an indicator indicating the AC status as described in connection with the fourth embodiment or an AC traffic status as described in connection with the fifth embodiment in the EAS discovery request message and transmit it to the EES 502.

Upon receiving the EAS discovery request message from the EEC 503, the EES 502 performs necessary operations (e.g., operation 519).

According to an embodiment, upon receiving the EAS discovery request message from the EEC 503, the EAS 502 identifies whether the AC ID included in the EAS discovery request message or the AC status in the AC profile meets a designated condition. For example, the EAS 502 identifies whether the AC ID included in the EAS discovery request message corresponds to the AC ID or AC profile stored in operation 512.

According to an embodiment, the EES 502 identifies whether the EAS discovery trigger indicator index is included in the EAS discovery request message and whether there is an operation to be performed according to the corresponding EAS discovery trigger indicator index. For example, the EAS 502 may search for a corresponding EAS 501 according to the EAS discovery trigger indicator index and perform an operation for triggering EAS instantiation for the EAS 501 through the orchestrator.

According to an embodiment, the EES 502 may select an EAS ID corresponding to the AC ID included in the EAS discovery filter and may perform an operation for triggering dynamic instantiation for the EAS 501.

According to another embodiment of the present disclosure, the procedure for triggering the instantiation of the EAS 501 through the orchestrator for the EAS 501 corresponding to the AC received from the EEC 503 by the EES 502 may be performed through the information about the AC included in the registration request message received from the EEC 503. For example, after operation 515 of FIG. 5, the EES 502 determines whether to scale-in or scale-out for the EAS corresponding to the AC and sends a request for the determined scale-out or scale-in (e.g., dynamic instantiation) to the orchestrator. For example, the EES 502 may determine EAS instantiation through the following information included in the registration request message received from the EEC 503:

An AC ID list;

An AC profile list;

AC status information or changed AC status information;

AC traffic status information or changed AC traffic status information; and/or

A list of AC IDs for which installation of AC was detected in the EEC 503.

Further, the EES 501 may register or release the context for the EAS 501 corresponding to the orchestrator. Upon receiving the request from the EES 501, the orchestrator may determine an operation for creating, adding, deleting, upgrading, or downgrading an EAS entity related to the AC.

Conditions under which status information and a change in status information of a UE app, i.e., an AC, occurs are described in connection with an embodiment 4.

FIG. 6 is a flowchart illustrating a status transition for a UE app status according to a user's work according to an embodiment 4 of the present disclosure.

The six statuses described in connection with FIG. 6 all denote statuses of an app in the UE, i.e., the AC. In describing the statuses of FIG. 6 below, application, AC and UE app, and UE application may be interchangeably used.

Referring to FIG. 6, each of the six statuses of the UE app may be defined as follows.

1) Application Unavailable (601) Status

This is a status in which no application is installed. In this status, an application may be downloaded from an application store (or play store). An application downloaded and then installed may transition to the application available status. When the AC in the application available status is removed by the UE's operating system, it becomes the application unavailable status.

2) Application Available (602) Status

This is a status in which an application is installed. This status may be an application inactive status or an application active status. When an AC is downloaded and then completely installed on the UE, the AC becomes the application available status. When the AC is removed, it becomes the application unavailable status.

3) Application Inactive (603) Status (when an Application is Installed but is not Running)

This is a sub status of the application available status. This is a status in which an application is installed but is not running. In this status, the application cannot generate traffic. Examples of the application inactive status include the following cases:

A status in which the application has been installed but not started yet;

A status in which the application has been paused by the mobile operating system or the user; and/or A status in which the application has been terminated by the mobile operating system or the user.

4) Application Active (604) Status (Application Traffic Ready Status)

This is a sub status of the application available status. In this status, the application is running. After the application is installed, the application starts, transitioning to the application active status. Or the application becomes the active status when the paused application is resumed. In the application active status, the application may generate application traffic regardless of the user's action.

5) Application Active Visible (605) Status

The application active visible status is a sub status of the application active status. In the application active visible status, the application may be shown to the user, and the application may control user interaction through a user interface with the user. In the application active visible status, application traffic may be sent to the server or EAS or generated as a result of the user's action. The application may enter the application active visible status at the same time as the application starts in the application inactive status. In the application active invisible status, when the application has the right to control the user interface or is focused, the application may transition to the active visible status. When the application in the application active visible status loses the right to control the user screen by the operating system or another application, the application may transition to the active invisible status. The application active visible status may include a status in which a screen for an application exists in the foreground.

6) Application Active Invisible (606) Status

This is a sub status of the application active status. In the application active invisible status, the application does not have the right to control the user's actions and is not visible to the user. Even in the application active invisible status, the AC may send or receive application traffic regardless of the user's action. In the application active invisible status, application traffic started in the application active visible status may be continuously transmitted and received. When the application is paused or terminated in the application active invisible status, the application may transition to the inactive status. When happening to have the user control right or obtaining the application focus in the application active visible status, the application may transition to the application active visible status. When losing the focus or the user control right in the application active visible status, the application may transition to the application active invisible status.

The statuses described in connection with FIG. 6 may be described as similar types of statuses with different names or a combination thereof in describing the main operations described in the present disclosure.

In one embodiment 5 of the present disclosure, conditions under which a change is made to the traffic status information for the UE app or AC and the application traffic status information are described.

FIG. 7 is a flowchart illustrating a status transition for a UE app traffic status according to an embodiment 5 of the present disclosure.

The statuses described in connection with FIG. 7 all represent traffic statuses of an app in the UE, that is, an AC. Hereinafter, in describing the statuses of FIG. 7, application traffic and AC traffic may be interchangeably used.

Referring to FIG. 7, the statuses of the UE app may be defined as follows.

1) Application Unavailable (701) Status

This is a status in which no application is installed on the UE. This is the same status as the application unavailable status of the fourth embodiment. No application traffic occurs in the application unavailable status.

2) Application Available (702) Status

This is a status in which the application is running. This is the same status as the application available status of the fourth embodiment.

3) Application Inactive (703) Status

This is a status in which an application is installed on the UE but is not running. This is the same status as the application inactive status of the embodiment 4. In the application inactive status, the application cannot generate traffic.

4) Application Traffic not-Ready (704) Status

The application traffic non-ready status is a status in which application traffic cannot be generated and may include an application unavailable status and an application inactive status.

5) Application Traffic Ready (705) Status

This is a sub status of the application available status. This is the same status as the application active status illustrated in the embodiment 4. Since the application is in the running status, the application may transmit and receive application traffic at any time, regardless of user actions. In the application inactive status or the application traffic not-ready status, the application may start and transition to the application traffic ready status. When the application is paused or terminated in the application traffic ready status, the application may transition to the application traffic not-ready status or the application inactive status. The application traffic ready status may have additional sub statuses, e.g., an application traffic dormant, application traffic coming, and application traffic exchanging status.

6) Application Traffic Dormant (706) Status

This is a sub status of the application traffic ready status. When application traffic starts in the application inactive status or the application traffic not-ready status, the application may transition to the application traffic dormant status. When a DNS query occurs from the AC or a DNS query occurs for the destination EAS in the application traffic dormant status, the application may transition to the application traffic coming status. Or, when application traffic (for the destination EAS) occurs, the application may transition to the application traffic exchanging status.

7) Application Traffic Coming (707) Status

This is a sub status of the application traffic ready status. This is a status in which application traffic is detected to be transmitted, received, or transmitted or received soon. For example, upon detecting a DNS query, the application becomes the application traffic coming status. When traffic between the application in the UE and the destination EAS is not generated during a given time (e.g., 1 second) in the application traffic coming status, the application may transition from the application traffic coming status to the application traffic dormant status.

8) Application Traffic Exchanging (708) Status

This is a sub status of the application traffic ready status. When the application traffic generated from the AC is detected or when generation of application traffic from the AC to the destination EAS is detected, the application traffic dormant status is changed to the application traffic exchange status. Examples of such application traffic may include a message for creating a TCP connection between the application in the UE and the destination EAS address and a message for establishing an HTTP connection. When traffic between the application in the UE and the destination EAS is not generated during a preset time (e.g., 10 seconds) in the application traffic exchanging status, the application may transition to the application traffic dormant status. The occurrence of a DNS query for the destination EAS address does not allow the application to transition to the application traffic coming status.

Figure 8:
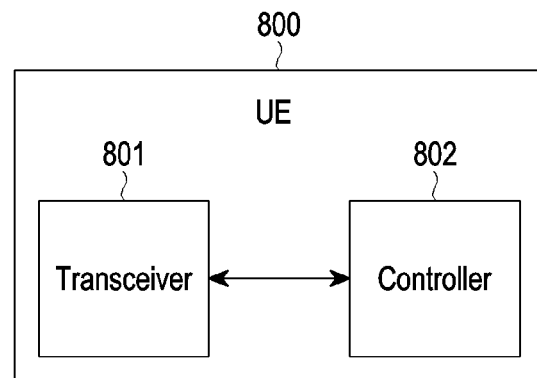
FIG. 8 is a block diagram illustrating a configuration of a UE according to various embodiments of the present disclosure.

FIG. 8 is a block diagram illustrating a configuration of a UE according to various embodiments of the present disclosure.

Referring to FIG. 8, a UE 800 may include a transceiver 801 and a controller 802 to communicate with other entities in the wireless communication system.

The transceiver 801 may transmit and receive signals to/from other network entities, and may include a CP of the UE. The controller 802 may control the transmission and reception of the transceiver and may include an EEC and AC of the UE.

Figure 9:
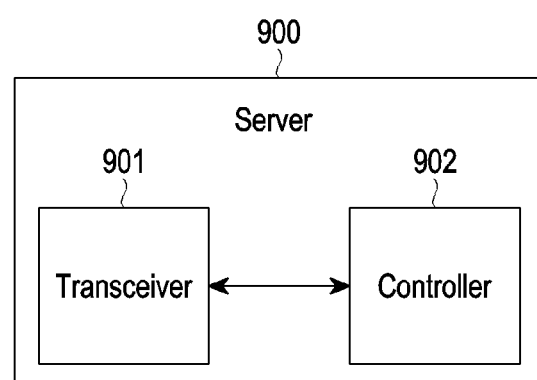
FIG. 9 is a block diagram illustrating a configuration of a server according to various embodiments of the present disclosure.

FIG. 9 is a block diagram illustrating a configuration of a server according to various embodiments of the present disclosure.

The server of FIG. 9 may correspond to, e.g., an ECS, EAS, EES, base station, or AMF.

Referring to FIG. 9, a server 900 communicating with other entities or the UE in the wireless communication system may include a transceiver 901 and a controller 902.

The transceiver 901 may transmit and receive signals to/from other network entities. The controller 902 may control the transceiver 901 and process signals transmitted and received.

It should be noted that the configuration views, example views of edge computing service providing methods, example views of operational procedures, and configuration views of FIGS. 1 to 9 are not intended as limiting the scope of the present disclosure. In other words, all the components, entities, or operational steps illustrated in FIGS. 1 to 9 should not be construed as essential components to practice the present disclosure, and the disclosure may be rather implemented with only some of the components without departing from the gist of the present disclosure.

The above-described operations of the base station or UE may be realized by equipping a memory device retaining their corresponding codes in the base station device or any component of the UE device. That is, the controller in the eNB or UE may execute the above-described operations by reading and executing the program codes stored in the memory device by a processor or central processing unit (CPU).

As described herein, various components or modules in the entity, UE or base station device may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of an edge enabler server (EES), the method comprising:
receiving, from an edge enabler client (EEC) in a user equipment (UE), a request message including an identity of an application client (AC) in the UE;
identifying an edge application server (EAS) based on the identity of the AC; and
transmitting, to the EEC in the UE, a response message including information about the EAS in response to the request message.

2. The method of claim 1, further comprising:
triggering an EAS management system to instantiate the EAS that matches with the identity of the AC.

3. The method of claim 1, further comprising:
invoking an application programming interface (API) managing a lifecycle of the EAS; and
transmitting information included in the request message to an EAS management system.

4. The method of claim 1, wherein the request message further includes one of information about an AC status reporting and information about an AC traffic status reporting.

5. The method of claim 1, further comprising:
receiving, from the EAS, a first message requesting for reporting status information for the AC;
storing reporting conditions for reporting the status information for the AC; and
transmitting, to the EAS, a second message in response to the first message.

6. The method of claim 5, wherein the transmitting the second message comprises:
determining whether the AC and the status information for the AC match with current status information for the AC; and
transmitting, to the EAS, the second message based on a result of determination that AC and the status information for the AC match with the current status information for the AC.

7. The method of claim 5, further comprising:
transmitting, to the EEC, a reporting subscription request message for status information for the AC, the reporting subscription request message including the reporting conditions for reporting the status information for the AC; and
receiving, from the EEC, the request message based on the reporting conditions.

8. A method of a user equipment (UE), the method comprising:
transmitting, by an edge enabler client (EEC) in the UE, a request message including an identity of an application client (AC) in the UE to an edge enabler server (EES); and
receiving, from the EES, a response message including information about an edge application server (EAS), wherein the EAS is identified based on the identity of the AC.

9. The method of claim 8,
wherein an EAS management system is triggered to instantiate the EAS that matches with the identity of the AC.

10. The method of claim 8, wherein the request message further includes one of information about an AC status reporting and information about an AC traffic status reporting.

11. An edge enabler server (EES), the EES comprising:
a transceiver; and
a processor coupled with the transceiver and configured to control to:
receive, from an edge enabler client (EEC) in a user equipment (UE), a request message including an identity of an application client (AC) in the UE,
identify an edge application server (EAS) based on the identity of the AC, and
transmit, to the EEC in the UE, a response message including information about the EAS in response to the request message.

12. The EES of claim 11, wherein the processor is configured to control to:
trigger an EAS management system to instantiate the EAS that matches with the identity of the AC.

13. The EES of claim 11, wherein the processor is configured to control to:
invoke an application programming interface (API) managing a lifecycle of the EAS, and
transmit information included in the request message to an EAS management system.

14. The EES of claim 11, wherein the request message further includes one of information about an AC status reporting and information about an AC traffic status reporting.

15. The EES of claim 11, wherein the processor is configured to control to:
receive, from the EAS, a first message requesting for reporting status information for the AC,
store reporting conditions for reporting the status information for the AC, and
transmit, to the EAS, a second message in response to the first message.

16. The EES of claim 15, wherein the processor is configured to control to:
determine whether the AC and the status information for the AC match with current status information for the AC, and
transmit, to the EAS, the second message based on a result of determination that AC and the status information for the AC match with the current status information for the AC.

17. The EES of claim 15, wherein the processor is configured to control to:
transmit, to the EEC, a reporting subscription request message for status information for the AC, the reporting subscription request message including the reporting conditions for reporting the status information for the AC, and
receive, from the EEC, the request message based on the reporting conditions.

18. A user equipment (UE), the UE comprising:
a transceiver; and
a processor coupled with the transceiver and configured to control to:
transmit, by an edge enabler client (EEC) in the UE, a request message including an identity of an application client (AC) in the UE to an edge enabler server (EES), and
receive, from the EES, a response message including information about an edge application server (EAS), wherein the EAS is identified based on the identity of the AC.

19. The UE of claim 18,
wherein an EAS management system is triggered to instantiate the EAS that matches with the identity of the AC.

20. The UE of claim 18, wherein the request message further includes one of information about an AC status reporting and information about an AC traffic status reporting.

* * * * *